United States Patent
Courtot et al.

(10) Patent No.: US 7,055,304 B2
(45) Date of Patent: Jun. 6, 2006

(54) DE-ICING DEVICE FOR TURBOJET INLET GUIDE WHEEL VANE, VANE PROVIDED WITH SUCH A DE-ICING DEVICE, AND AIRCRAFT ENGINE EQUIPPED WITH SUCH VANES

(75) Inventors: Yannick Jean Roger Courtot, Saint Pierre Du Perray (FR); Francois Marie Paul Marlin, Villiers Sous Gretz (FR); Jean Armand Francois Danielo, Alfortville (FR)

(73) Assignee: SNECMA Moteurs, Paris (FR)

( * ) Notice: Subject to any disclaimer, the term of this patent is extended or adjusted under 35 U.S.C. 154(b) by 37 days.

(21) Appl. No.: 10/883,699

(22) Filed: Jul. 6, 2004

(65) Prior Publication Data
US 2005/0109011 A1    May 26, 2005

(30) Foreign Application Priority Data
Jul. 17, 2003  (FR) .................................. 03 50345

(51) Int. Cl.
*F02G 3/00*  (2006.01)
(52) U.S. Cl. ................................ 60/39.093; 244/134 B
(58) Field of Classification Search ............ 60/39.093; 244/134 B, 134 C, 134 R
See application file for complete search history.

(56) References Cited

U.S. PATENT DOCUMENTS

| | | | |
|---|---|---|---|
| 2,625,010 A | * | 1/1953 | Clark ...................... 60/39.093 |
| 2,840,298 A | * | 6/1958 | Castle et al. ................. 165/172 |
| 3,220,697 A | * | 11/1965 | Smuland et al. .......... 416/96 R |
| 4,821,758 A | | 4/1989 | Ruis |
| 4,897,020 A | | 1/1990 | Tonks |
| 4,972,671 A | | 11/1990 | Asselin et al. |
| 5,795,128 A | | 8/1998 | Eichstadt |
| 2002/0071766 A1 | | 6/2002 | Corbin et al. |

FOREIGN PATENT DOCUMENTS

| | | |
|---|---|---|
| FR | 2 607 188 | 5/1988 |
| FR | 2 631 386 | 11/1989 |
| GB | 774 501 | 5/1957 |
| JP | 10-184389 | * 7/1998 |

\* cited by examiner

*Primary Examiner*—Ted Kim
(74) *Attorney, Agent, or Firm*—Oblon, Spivak, McClelland, Maier & Neustadt, P.C.

(57) ABSTRACT

The de-icing device is intended for the vane (10) of the inlet guide wheel (4) of a turbojet (2), comprising a fixed part (12) arranged on the upstream side and a mobile flap (18) arranged on the downstream side, in which said fixed part (12) comprises a trailing edge (16) substantially in the shape of a "U", with one of the branches (162) being located on the intrados side (I) and the other branch (164) being located on the extrados side (E). It comprises at least one emission window (202), oriented substantially along an upstream-downstream direction, and arranged along the branch (162) of the "U" located on the intrados side (I) of the trailing edge (16).

The inlet guide wheel (4) vane (10) is equipped with at least such a de-icing device.

The aircraft engine (2) comprises at least one vane (10) equipped with such a de-icing device.

32 Claims, 6 Drawing Sheets

DE-ICING DEVICE FOR TURBOJET INLET GUIDE WHEEL VANE, VANE PROVIDED WITH SUCH A DE-ICING DEVICE, AND AIRCRAFT ENGINE EQUIPPED WITH SUCH VANES

DESCRIPTION

1. Technical Field

This invention relates to the technical domain of de-icing devices for turbojet inlet guide wheels. It also relates to an inlet guide wheel vane equipped with such a de-icing device. It also relates to an aircraft engine equipped with such vanes.

2. State of Prior Art

For example document FR 2 607 188 describes turbojet inlet guide wheel vanes with variable pitch connecting an inlet casing to a central hub. Each of these vanes comprises a fixed part and a mobile flap. The fixed parts are structural parts arranged radially about the central hub and act as a support for the inlet casing. They are also called inlet casing arms. The mobile flaps are located on the downstream side of the fixed part with which they are associated and are articulated to it about a direction substantially radial from the central hub, by means of a radially internal pivot and a radially external pivot. The orientation of the mobile flaps provides a means of regularizing the airflow supplying compressor stages on the downstream side.

When the turbojet operates under some environmental conditions, for example when it is installed on an aircraft that flies under damp and cold atmospheric conditions, ice can form on the inlet vanes and more particularly on the leading edge of the fixed part and on the faces of the mobile flap. If pieces of ice formed on the surface of the inlet vanes would detach from this surface, they could penetrate into the turbojet and cause damage. The performances of the turbojet could also be degraded due to poor supply to the downstream side mobile wheels.

Therefore, attempts are usually made to reduce the formation of ice on the inlet vanes, and preferably to prevent the formation of ice on these vanes.

There are different de-icing devices for inlet wheel vanes, that draw off hot air from the high-pressure compressor, convey this air as far as an air collector and then use it to heat inlet wheel vanes and to keep this vane at a sufficiently high temperature to prevent the formation of ice.

Document FR 2 631 386 discloses a method of de-icing the fixed part, and particularly its leading edge. The fixed part is hollow, hot air drawn off from the compressor is injected into said fixed part and circulates inside it.

Figure 3:
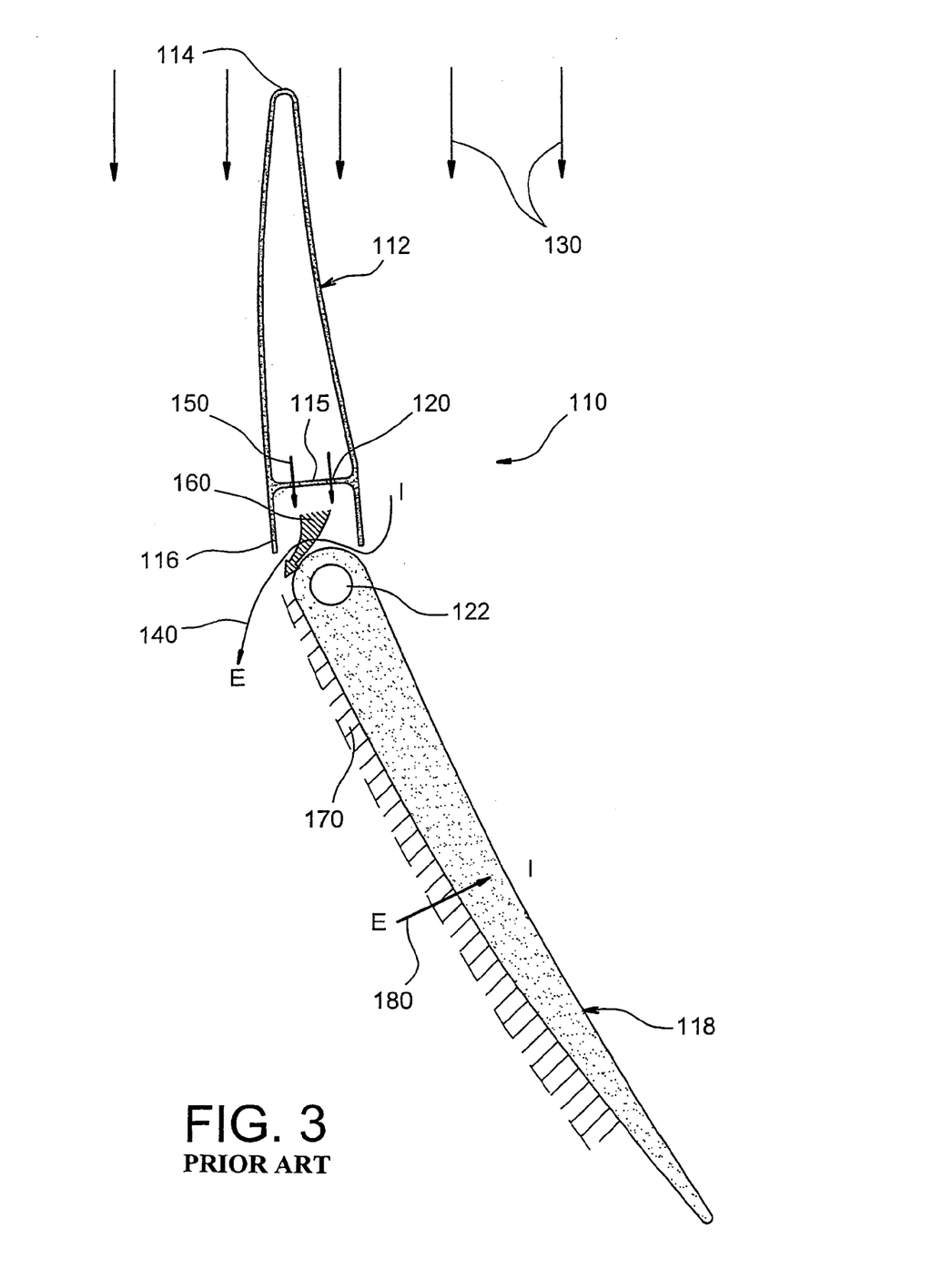
FIG. 3, already described, shows a cross-sectional view of a vane of an inlet guide wheel and its de-icing device according to prior art.

FIG. 3 attached describes a de-icing device according to prior art. A vane 110 of an inlet guide wheel comprises a fixed part 112 and a mobile flap 118 located on the output side of the fixed part 112 and capable of pivoting about a substantially radial direction 122. The mobile flap 118 is de-iced by means of the hot air originating from the associated fixed part 112. The outside air forming the main airflow materialized by the arrows 130, penetrates into the turbojet on each side of the leading edge 114 of the fixed part 112. Then, due to the pressure difference existing between the intrados side I and the extrados side E of the inlet vane 110, outside air flows from the intrados side I towards the extrados side E, close to the connection between the fixed part 112 and the mobile flap 118 as shown by arrow 140. Furthermore, the fixed part 112 is hollow. Hot air originating from the compressor is injected into said fixed part 112 and circulates inside it, so as to prevent formation of ice on its leading edge 114 and on its surface, as described above with reference to document FR 2 631 386. The fixed part 112 is provided with a downstream edge 116 with a "U" shaped cross-section, the branches of the "U" being directed towards the downstream side and towards the mobile flap. Through holes 120 are formed on the bottom 115 of the "U" through which hot air that was injected into the fixed part 112 flows, then forming the secondary air flow, and can then be sent onto the mobile flap 118 as shown by the arrows 150. This secondary hot air flow is drawn up by the main cold air current 140, as shown by arrow 160, and then circulates in the form of a film 170 along the extrados side E of the mobile flap 118. Therefore, the mobile flap 118 is de-iced as follows: its extrados side E is heated directly by the film 170 by the heat convection effect, while its intrados I is heated indirectly by conduction of heat through the thickness of said mobile flap 118, from the extrados E to the intrados side I as shown by arrow 180.

Due to the orientation of the mobile flap during operation, it is known that ice tends to form preferentially on the side of the intrados side. Therefore, the objective is to make de-icing of the mobile flap more efficient on the intrados side.

However, the de-icing device that has just been described has a number of disadvantages.

A first disadvantage is in making through holes on the bottom of the "U" shaped part of the trailing edge of the fixed part. These holes are made after the operation to form the "U" and before a brazing operation on the trailing edge. When the holes are obtained by an electro erosion or punching perforation technique, expensive tooling is necessary that is difficult to modify if the part definition is changed. When the holes are obtained by a laser drilling technique, undesirable thermal stresses develop around their periphery. And when the brazing operation of the trailing edge is being performed, there is a risk that these holes will be blocked.

A second disadvantage lies in the fact that heat conduction is particularly efficient for a thin mobile flap. The efficiency of de-icing of the intrados side of the mobile flap is not as good for a thick flap, unless more hot air is drawn off and directed onto it, which is usually not desirable.

A third disadvantage occurs when the mobile flap has a high chord. In this case, the mobile flap is incompletely de-iced, since the hot air film sent onto the extrados side of the mobile flap does not correctly reach the trailing edge of said mobile flap.

A fourth disadvantage is related to the nature of the material from which the mobile flap is made. The mobile flap is more and more frequently made from a composite material rather than a metallic material, particularly for mass reduction reasons. Since the composite material is a bad conductor of heat, it is impossible to use a de-icing device based on conduction of heat through the thickness of the mobile flap.

Therefore, a de-icing device is needed that is capable of de-icing a vane of a turbojet inlet guide wheel, of the type having a fixed part that is also an inlet casing support arm and a mobile flap with variable pitch, that can be used even when the mobile flap is relatively thick or has a high chord and/or when it is made from a composite material, and which is inexpensive and easy to make on a production line.

SUMMARY OF THE INVENTION

This invention proposes a de-icing device for a vane of a turbojet inlet guide wheel that does not have the disadvantages mentioned above.

According to a first aspect, the invention relates to a de-icing device for the vane of a turbojet inlet guide wheel, said vane comprising a fixed part arranged on the upstream side and an associated mobile flap arranged on the downstream side. The fixed part is a structural part radiating from a central hub and acting as a support arm for a casing of the inlet guide wheel. It comprises a hollow body and a trailing edge, for which the profile is substantially in the shape of a "U", with the branches extending substantially in the downstream direction, one of the branches being located on the intrados side and the other branch being located on the extrados side. The mobile flap is capable of pivoting around a substantially radial direction starting from the central hub, through a central pivot arranged on the central hub, and a peripheral pivot arranged on the inside face of the casing.

According to a first embodiment of the first aspect, said de-icing device comprises at least one emission window, oriented substantially along an upstream-downstream direction, and arranged only along the branch of the "U" located on the intrados side of the trailing edge of the fixed part.

According to a second embodiment of the first aspect, said de-icing device comprises at least one emission window, oriented substantially along an upstream-downstream direction and arranged along the branch of the "U" located on the intrados side of the trailing edge of the fixed part, and at least one emission window oriented substantially along an upstream-downstream direction and arranged along the branch of the "U" on the extrados side of the trailing edge of the fixed part.

Optionally, the de-icing device also comprises through perforations, substantially along an upstream-downstream direction, on the bottom of the "U" forming the trailing edge of the fixed part, said perforations being located at least in an area located facing the connection of the mobile flap 18 with one of the pivots, during operation.

Preferably, the de-icing device also comprises means of conveying hot air to the inlet guide wheel casing from a compression stage on the downstream side of said inlet wheel.

According to a second aspect, the invention relates to a vane of a turbojet inlet guide wheel of the type comprising a fixed part and a mobile flap capable of pivoting about a substantially radial direction from a central hub, said vane being provided with a de-icing device according to the first aspect of the invention.

According to a third aspect, the invention relates to an aircraft engine comprising one inlet guide wheel equipped with vanes according to the second aspect of the invention. This aircraft engine comprises at least one de-icing device according to the first aspect of the invention.

BRIEF DESCRIPTION OF THE DRAWINGS

The invention will be better understood after reading the detailed description given below of particular embodiments of the invention, supplied for illustrative purposes and that are in no way limitative, with respect to the attached drawings among which.

DETAILED DESCRIPTION OF PARTICULAR EMBODIMENTS

Figure 1:
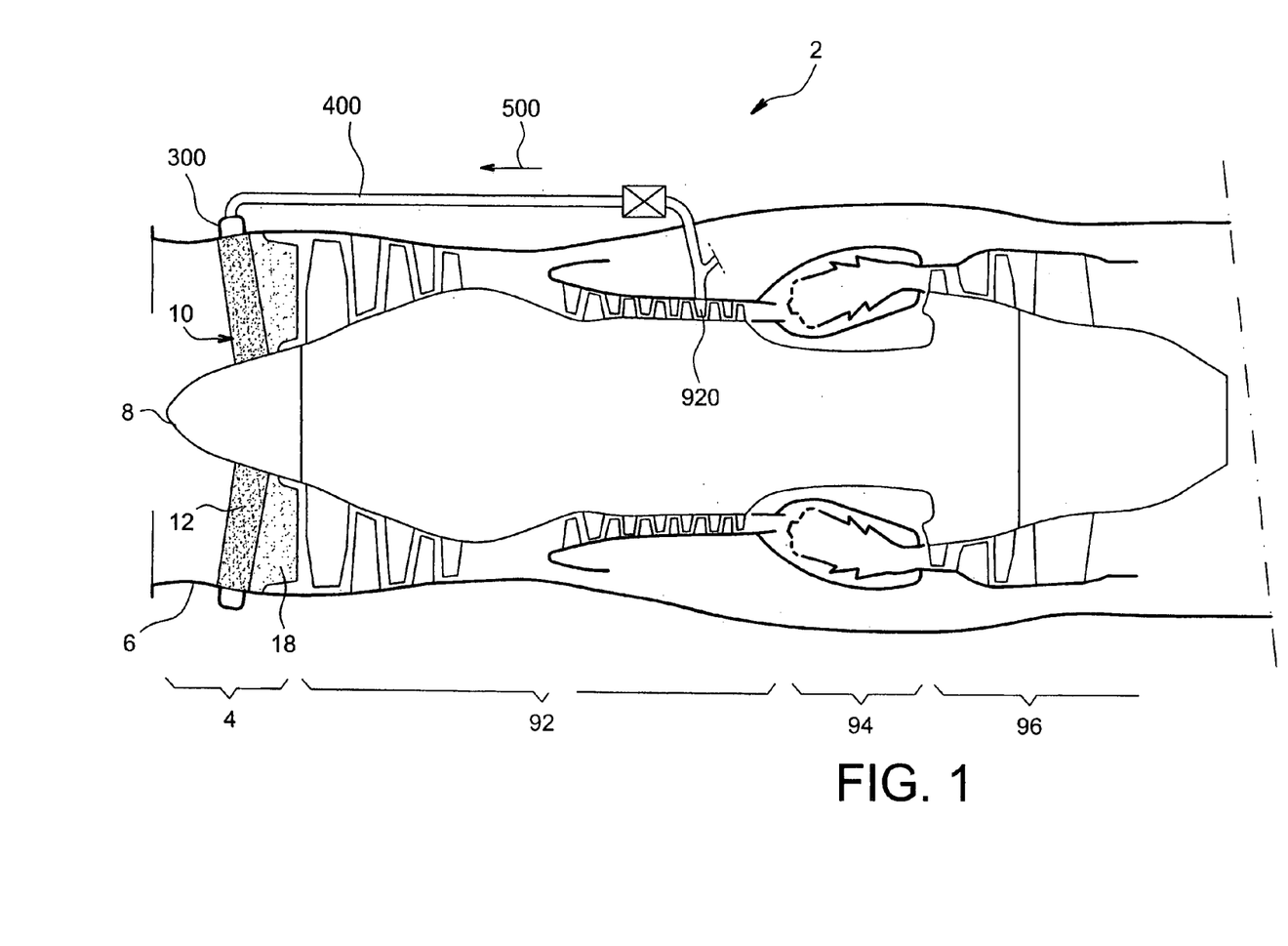
FIG. 1 shows a longitudinal section of an aircraft engine showing the location and the environment of the de-icing device according to the invention.

With reference firstly to FIG. 1, the figure shows a simplified view of an aircraft engine 2 comprising an inlet guide wheel 4 at the forward end formed by an inlet casing 6 substantially concentric about a central hub 8 and vanes 10. The vanes 10 are themselves formed by a fixed part 12, and a mobile flap 18. One or several compression stages 92, a combustion chamber 94 and a turbine 96 are provided on the downstream side of the inlet guide wheel 4.

The de-icing device according to the invention comprises hot air inlet means 300, 400, given in FIG. 1. They comprise a collector 300, arranged circumferentially around the casing 6 of the inlet guide wheel 4. They also comprise at least one conveyance duct 400 that connects said collector 300 to a compression stage 920 from which said hot air is drawn off. When several conveyance ducts 400 are present, they are preferably distributed uniformly around the periphery of the aircraft engine 2. Hot air, drawn off from said compression stage 920, circulates in the conveyance duct 400 (arrow 500), and then arrives in the collector 300, from where it then flows to the fixed parts of the vanes 10.

Figure 2:
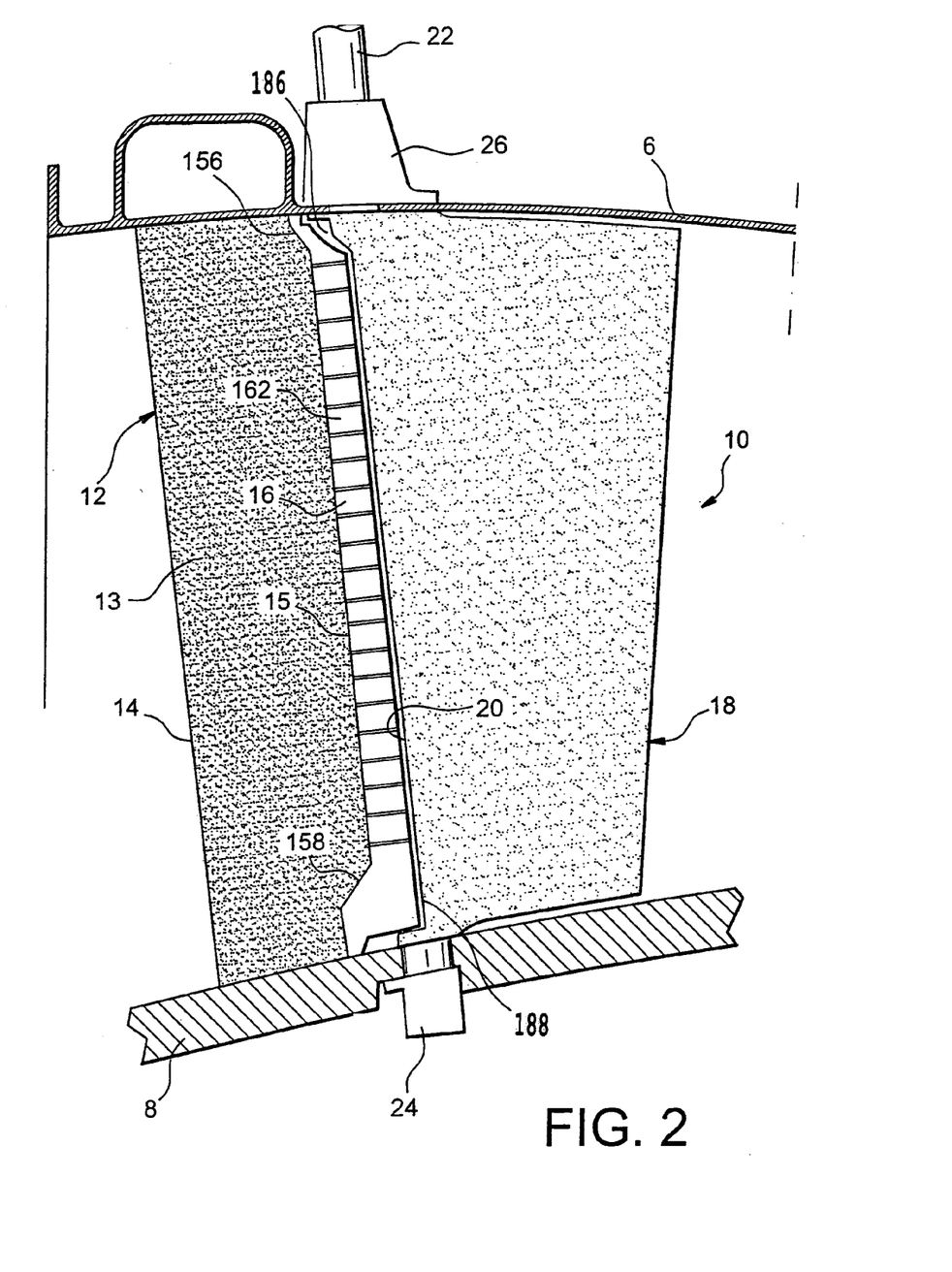
FIG. 2 shows a side view of an inlet guide wheel vane showing the fixed part, the mobile flap and the collector, a part of the trailing edge of the fixed part being withdrawn.

FIG. 2 more precisely illustrates a vane 10 of an inlet guide wheel with a fixed part 12 on the upstream side and a mobile flap 18 on the downstream side. The fixed part 12 is a structural part that is rigidly connected firstly to a central hub 8, and secondly to a casing 6 that it contributes to supporting. It comprises a hollow body 13, a leading edge 14, and a trailing edge 16 in the shape of a "U" with a bottom 15 and branches 162, 164 that extend towards the downstream direction. To facilitate understanding, the branch of the "U" on the extrados side 164 of the trailing edge 16 has been removed, and all that can be seen in FIG. 2 is the branch of the "U" on the intrados side 164. The mobile flap 18 is capable of pivoting about a substantially radial direction 22 starting from the central hub 8, through a central pivot 24 fixed to said central hub 8 and a peripheral pivot 26 fixed to the input casing 6, said pivots 24, 26 being arranged close to the leading edge 20 of the mobile flap 18.

Figures 4, 5:
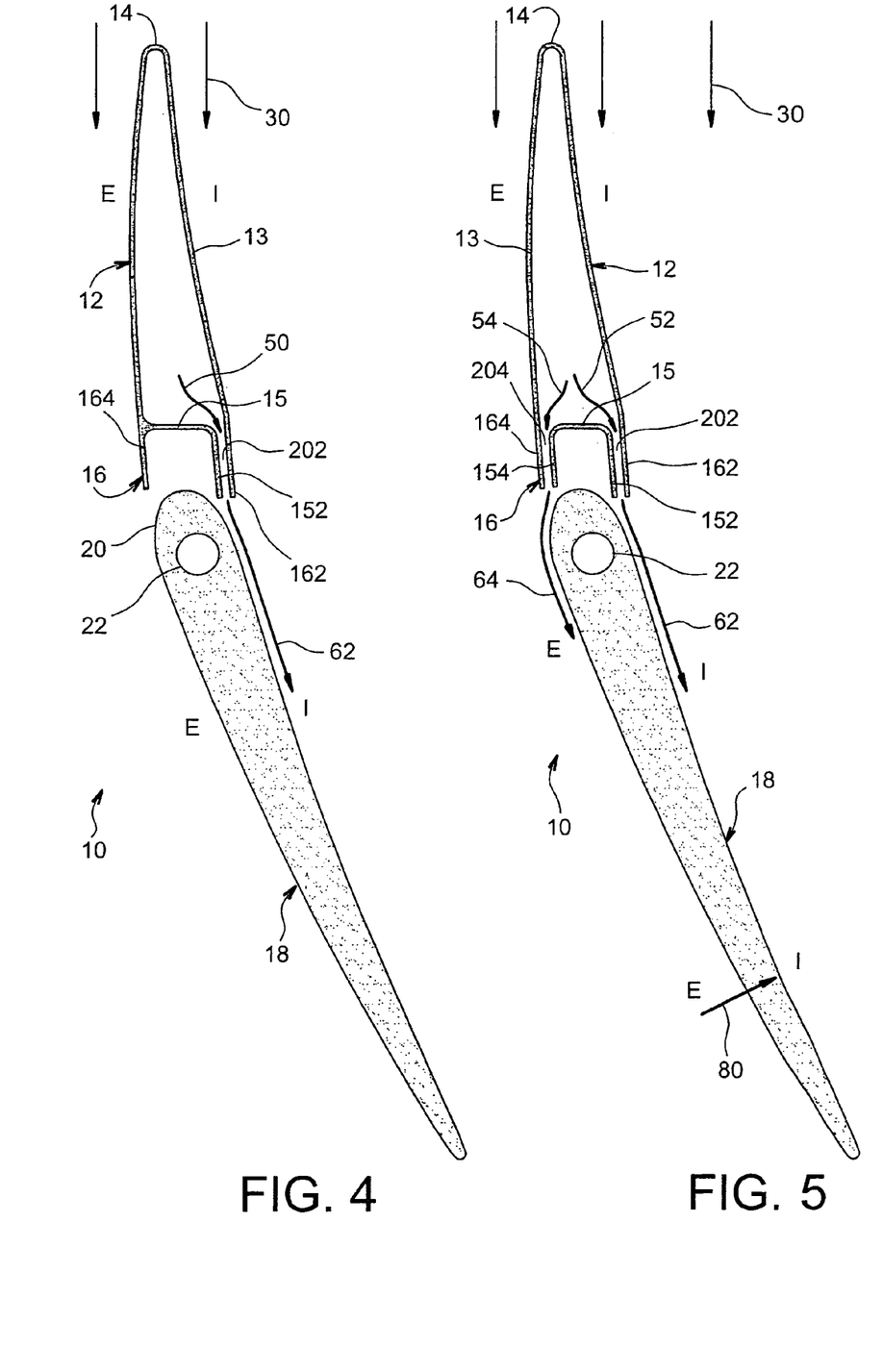
FIG. 4 is a cross-section of a vane of an inlet guide wheel and its de-icing device according to the first embodiment of the invention.
FIG. 5 is similar to FIG. 4 for a first variant of the second embodiment of the de-icing device.

First and second embodiments of the de-icing device are illustrated in FIG. 4 and in FIG. 5 respectively. In the figures, the fixed part 12 and the mobile flap 18 of the vane 10 of the inlet guide wheel are shown in cross-sectional views.

A main airflow originating from outside the aircraft engine is marked in the figures by arrows 30, and arrives on the leading edge 14 of the fixed part 12.

A secondary hot air flow originating from a compression stage 920 on the downstream side in the aircraft engine 2 is conveyed through the conveyance means 300, 400 from the inlet casing 6 into each hollow body 13 of the fixed part 12.

According to the first embodiment of the de-icing system illustrated in FIG. 4, the branch 162 located on the intrados side of the trailing edge 16 of the fixed part 12, comprises at least one emission window 202 through which the secondary air flows outside the hollow body 13, as indicated by the arrow 50. This hot air then passes along the intrados side of the mobile flap 18 as indicated by the arrow 62. The intrados of the mobile flap 18 is thus directly heated by the convection effect. Consequently, the formation of ice on the intrados side of the mobile flap is prevented. According to this first embodiment, only the branch 162 located on the intrados side comprises such an emission window 202.

According to the second embodiment of the de-icing system illustrated in FIG. 5:
 the branch 162 located on the intrados side of the trailing edge 16 of the fixed part 12, comprises at least one emission window 202 through which secondary air flows outside the hollow body 13 as indicated by the arrow 52,
 the branch 164 that is located on the extrados side of the trailing edge 16 of the fixed part 12, comprises at least one emission window 204 through which the secondary air flows outside the hollow body 13, as indicated by the arrow 54.

In the same way as in the first embodiment, the hot air passing through an emission window 202 located in the branch 162 on the intrados side of the fixed part 12, then passes along the intrados side of the mobile flap 18 as indicated by the arrow 62. The intrados side of the mobile flap 18 is thus heated directly by the convection effect. Furthermore, hot air passing through an emission window 204 located in the branch 164 on the extrados side of the fixed part 12 then passes along the extrados side of the mobile flap 18 as indicated by the arrow 64. The extrados side of the mobile flap is thus heated directly by the convection effect. The intrados side of the mobile flap 18 is then heated indirectly by the conduction effect through the thickness of the mobile flap 18 as indicated by the arrow 80. Consequently, the formation of ice on the intrados side of the mobile flap is prevented by combined convection (arrows 62, 64) and conduction effect (arrow 80). This second embodiment is more particularly adapted to mobile flaps 18 made of a heat conducting material and that are sufficiently thin so that the conduction effect is significant. According to this second embodiment, the branch 162 on the intrados side and the branch 164 on the extrados side comprise such an emission window 202, 204.

In accordance with the first variant of the second embodiment of the de-icing device, the emission windows 202 located on the intrados side and the emission windows 204 located on the extrados side are arranged facing each other, as shown in FIG. 5.

Figure 6:
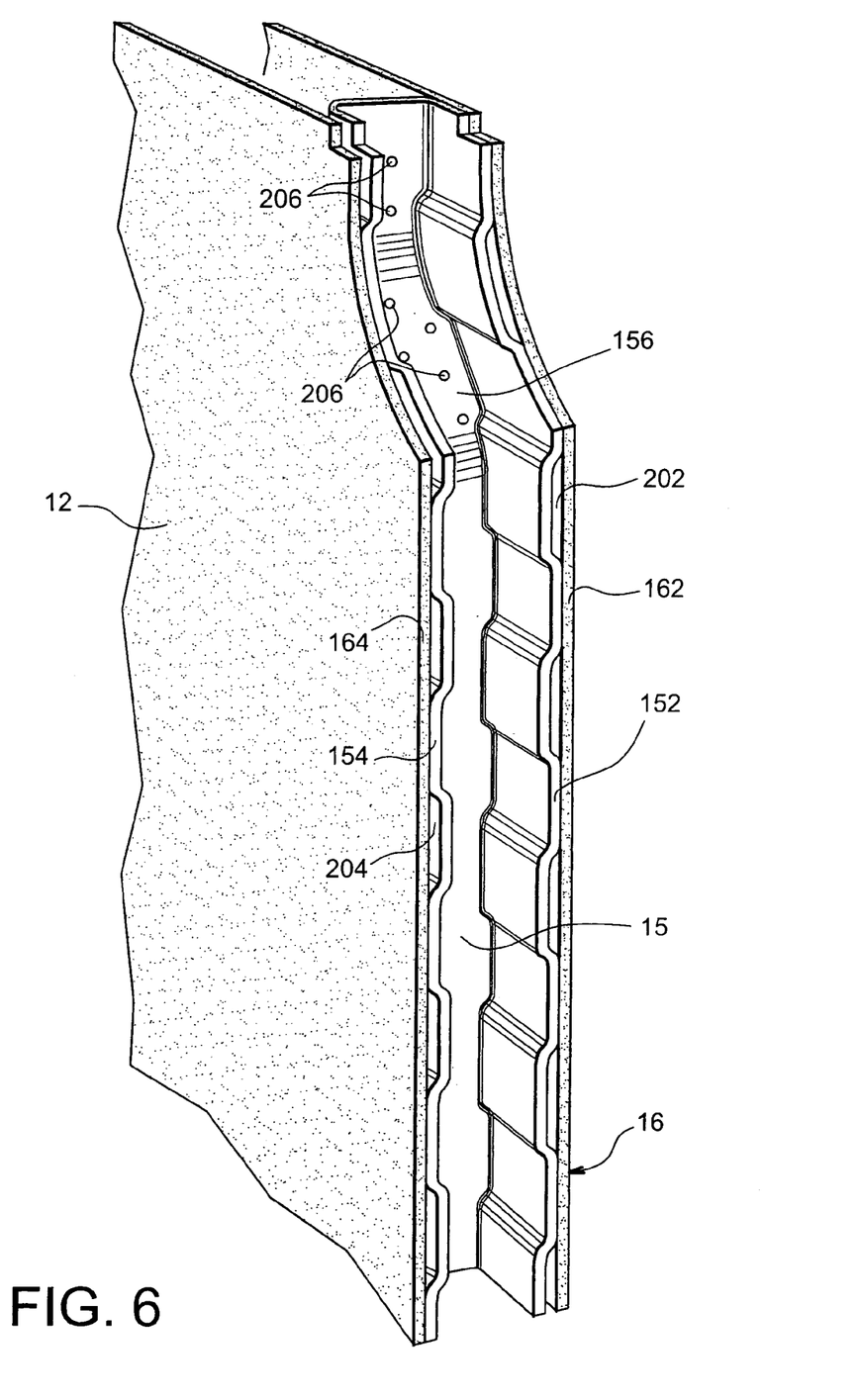
FIG. 6 shows a perspective view illustrating a second variant of the second embodiment of the de-icing device.

According to the second variant of the second embodiment of the de-icing device, the emission windows 202 located on the intrados side and the emission windows 204 located on the extrados side are staggered from each other, as shown in FIG. 6 that illustrates a perspective view from the back of the "U"-shaped trailing edge 16 of the fixed part 12, for this second variant.

According to the first or second embodiment of the de-icing device, the emission windows 202, 204 located on the same branch 162, 164 of the "U" are preferably uniformly distributed along said branch 162, 164 of the "U", and preferably along the entire trailing edge 16 of the fixed part 12.

The emission windows 202 and 204 illustrated in FIGS. 2, 4, 5 and 6 are obtained by putting a ribbed plate 152 into contact with the intrados side branch of the "U", and a ribbed plate 154 into contact with the extrados side branch of the "U", said ribbed plate 152, 154 prolonging the bottom 15 of the trailing edge 16 and being located perpendicular to said bottom 15. This ribbed plate 152, 154 is obtained by a machining process, or by a foundry process, or preferably by cutting and stamping operations starting from a flat plate. Thus, emission windows 202, 204 intended for the passage of hot air from the inside of the hollow body 13 of the fixed part 12 towards the mobile flap 18, are created at locations in which the ribbed plate 162, 164 is not in contact with the branch 162, 164 of the "U".

For manufacturing, it is advantageous to make the trailing edge 16 of the fixed part 12 in this manner, since the number of necessary operations is reduced and all that is necessary is one production line to make the entire fixed part. Subsequently, production costs are also reduced.

The emission windows 202, 204 may be in different forms. Example embodiments of these different forms are illustrated in FIGS. 7a, 7b, 7c, 7d that diagrammatically show a side view of a ribbed plate 152, 154. Said ribbed plate 152, 154 comprises areas in relief 166 that will be made adjacent to the branches 162, 164 of the "U", and hollow areas that will form a wall of the emission window 202, 204 defining the shape of said emission window 202, 204. The arrows 58 in FIGS. 7a to 7d diagrammatically show a hot air flow that will pass through an emission window 202, 204.

Figure 7A:
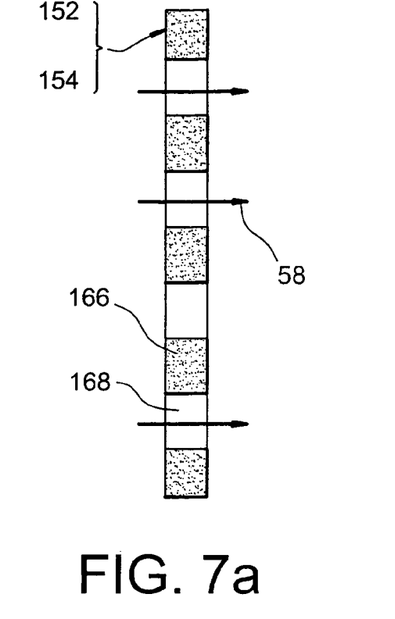
FIGS. 7a, 7b, 7c, 7d diagrammatically show a sectional view along a longitudinal plane, showing different embodiments of emission windows.

According to a first embodiment illustrated in FIG. 7a, the geometry of the hollow areas 168 is such that the cross-section of the emission windows 202, 204 is constant and prismatic.

Figure 7B:
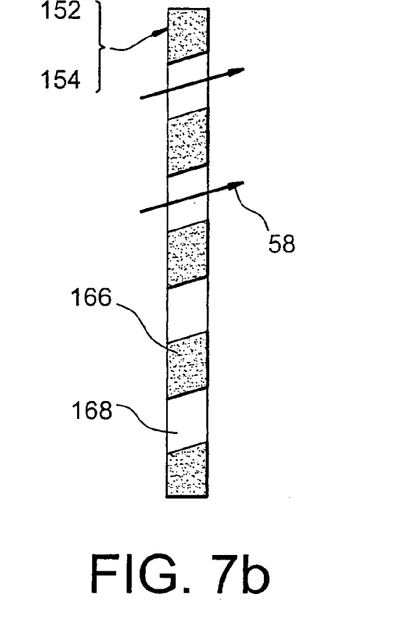

According to a second embodiment illustrated in FIG. 7b, the geometry of the hollow areas 168 is such that the cross-section of the emission windows 202, 204 is constant and inclined upwards in the direction of the hot air flow 58.

Figure 7C:
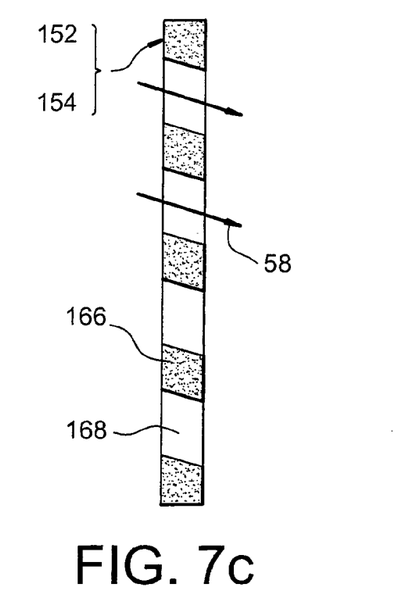

According to a third embodiment illustrated in FIG. 7c, the geometry of the hollow areas 168 is such that the cross-section of the emission windows 202, 204 is constant and inclined downwards in the direction of the hot air flow 58.

Figure 7D:
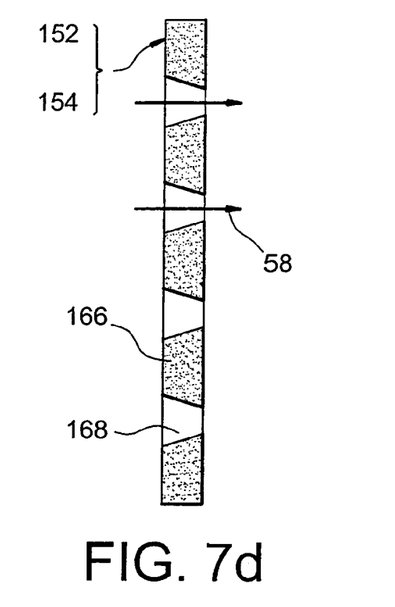

According to a fourth embodiment illustrated in FIG. 7d, the geometry of the hollow areas 168 makes the cross-section of the emission windows 202, 204 variable, for example in the shape of a fish tail.

Other emission window geometries are possible. Furthermore, it will be possible to combine successive emission windows with different shapes along the branch 162 on the intrados side and/or along the branch 164 on the extrados side, for example at least one emission window with a constant prismatic section, and/or at least one emission window with a constant section inclined upwards and/or at least one emission window with a constant section inclined downwards and/or at least one emission window with a variable section.

As can be seen in FIG. 6, the connection of the mobile flap 18 with each of the pivots 24, 26 is made in an area 186, 188 of said mobile flap 18 in which the geometry is inclined with respect to the geometry of the remainder of the leading edge 20 of said mobile flap 18. Facing these zones 186, 188 with inclined geometry, the trailing edge 16 of the fixed part 12 itself comprises zones 156, 158 for which the geometry is inclined with respect to the geometry of the remainder of said trailing edge 16, called "S" zones. Optionally, the de-icing device comprises perforations 206 in at least one of these "S" zones 156, 158, passing through the bottom of the "U"× forming said trailing edge 16 substantially along an upstream-downstream direction. For example said perforations may be made by laser. Thus, said area 186, 188 facing the leading edge 20 of the mobile flap 18 may also be in contact with the hot air.

One advantage of these optional perforations lies in the fact that they enable more precisely bringing in hot air onto the leading edge of the flap close to the pivots, by the convection effect, and then as far as the connection between the flap and each of the pivots by the conduction effect. Thus, it is possible to avoid blockage of the flap pivoting movement by avoiding the presence of ice at this connection between the flap and each of the pivots.

The invention claimed is:

1. A de-icing device for a vane (10) of an inlet guide wheel (4) of a turbojet (2),
    said vane (10) comprising a fixed part (12) arranged on the upstream side and an associated mobile flap (18) arranged on the downstream side, and
    said fixed part (12) comprising a hollow body (13) and a trailing edge (16), for which the profile is substantially in the shape of a "U", with the branches (162, 164) extending substantially in the downstream direction, one of the branches (162) being located on the intrados side (I) and the other branch (164) being located on the extrados side (E),
    characterized in that it comprises at least one emission window (202), oriented substantially along an upstream-downstream direction, and arranged only along the branch (162) of the "U" located on the intrados side (I) of the trailing edge (16) of the fixed part (12), said emission window (202) being obtained by putting a ribbed plate (152) into contact with said branch (162) of the "U".

2. A de-icing device according to claim 1, characterized in that at least one of the emission windows (202) has a constant and prismatic cross-section.

3. A de-icing device according to claim 1, characterized in that at least one of the emission windows (202) has a constant cross-section inclined upwards.

4. A de-icing device according to claim 1, characterized in that at least one of the emission windows (202) has a constant cross-section inclined downwards.

5. A de-icing device according to claim 1, characterized in that at least one of the emission windows (202) has a variable cross-section.

6. A de-icing device according to claim 5, characterized in that said variable cross-section is in the shape of a fish tail.

7. A de-icing device according to claim 1, characterized in that when a branch (162) of the "U" forming the trailing edge (16) of the fixed part (12) comprises at least two emission windows (202), said emission windows (202) are uniformly distributed along said branch (162).

8. A de-icing device according to claim 1, characterized in that said ribbed plate (152) is obtained by cutting and stamping operations from a flat plate.

9. A de-icing device according to claim 1, said mobile flap (18) being capable of pivoting about a substantially radial direction (22) starting from a central hub (8) through a central pivot (24) and a peripheral pivot (26), characterized in that it also comprises through perforations (206), substantially along an upstream-downstream direction, the bottom (15) of the "U" forming the trailing edge (16) of the fixed part (12), said perforations (206) being located at least in a zone (156, 158) located substantially facing one of said pivots (24, 26), during operation.

10. A de-icing device according to claim 1, characterized in that it also comprises means (300, 400) of conveying hot air to a casing (6) of the inlet guide wheel (4) from a compression stage (920) on the downstream side of said inlet guide wheel (4).

11. A de-icing device according to claim 10, characterized in that said hot air conveyance means (300, 400) comprise a collector (300), arranged circumferentially around said casing (6).

12. A de-icing device according to claim 11, characterized in that said hot air conveyance means (300, 400) also comprise at least one conveyance duct (400) that connects said compression stage (920) to said collector (300).

13. A vane (10) of an inlet guide wheel (4) of a turbojet (2), of the type comprising a fixed part (12) and a mobile flap (18) capable of pivoting about a substantially radial direction (22) starting from a central hub (8), characterized in that it is provided with a de-icing device according to claim 1.

14. An aircraft engine (2), characterized in that it comprises an inlet guide wheel (4) equipped with vanes (10) according to claim 13.

15. An aircraft engine (2), characterized in that it comprises at least one de-icing device according to claim 1.

16. A de-icing device for a vane (10) of an inlet guide wheel (4) of a turbojet (2),
    said vane (10) comprising a fixed part (12) arranged on the upstream side and an associated mobile flap (18) arranged on the downstream side, and
    said fixed part (12) comprising a hollow body (13) and a trailing edge (16), for which the profile is substantially in the shape of a "U", with the branches (162, 164) extending substantially in the downstream direction, one of the branches (162) being located on the intrados side (I) and the other branch (164) being located on the extrados side (E),
    characterized in that it comprises at least one emission window (202), oriented substantially along an upstream-downstream direction, and arranged along the branch (162) of the "U" located on the intrados side (I) of the trailing edge (16) of the fixed part (12), said emission window (202) being obtained by putting a ribbed plate (152) into contact with said branch (162) of the "U",
    and in that it also comprises at least one emission window (204) oriented substantially along an upstream-downstream direction, and arranged along the branch (164) of the "U" located on the extrados side (E) of the trailing edge (16) of the fixed part (12), said emission window (204) being obtained by putting a ribbed plate (154) into contact with said branch (164) of the "U".

17. A de-icing device according to claim 16, characterized in that at least one of the emission windows (202, 204) has a constant and prismatic cross-section.

18. A de-icing device according to claim 16, characterized in that at least one of the emission windows (202, 204) has a constant cross-section inclined upwards.

19. A de-icing device according to claim 16, characterized in that at least one of the emission windows (202, 204) has a constant cross-section inclined downwards.

20. A de-icing device according to claim 16, characterized in that at least one of the emission windows (202, 204) has a variable cross-section.

21. A de-icing device according to claim 20, characterized in that said variable cross-section is in the shape of a fish tail.

22. A de-icing device according to claim 16, characterized in that when a branch (162, 164) of the "U" forming the trailing edge (16) of the fixed part (12) comprises at least two emission windows (202, 204), said emission windows (202, 204) are uniformly distributed along said branch (162, 164).

23. A de-icing device according to claim 16, characterized in that said ribbed plate (152, 153) is obtained by cutting and stamping operations from a flat plate.

24. A de-icing device according to claim 16, said mobile flap (18) being capable of pivoting about a substantially radial direction (22) starting from a central hub (8) through a central pivot (24) and a peripheral pivot (26), characterized in that it also comprises through perforations (206), substantially along an upstream-downstream direction, the bottom (15) of the "U" forming the trailing edge (16) of the fixed part (12), said perforations (206) being located at least in a zone (156, 158) located substantially facing one of said pivots (24, 26), during operation.

25. A de-icing device according to claim 16, characterized in that it also comprises means (300, 400) of conveying hot air to a casing (6) of the inlet guide wheel (4) from a compression stage (920) on the downstream side of said inlet guide wheel (4).

26. A de-icing device according to claim 25, characterized in that said hot air conveyance means (300, 400) comprise a collector (300), arranged circumferentially around said casing (6).

27. A de-icing device according to claim 26, characterized in that said hot air conveyance means (300, 400) also comprise at least one conveyance duct (400) that connects said compression stage (920) to said collector (300).

28. A De-icing device according to claim 16, characterized in that the emission window(s) (202) located on the intrados side (I) and the emission window(s) (204) located on the extrados side (E) are arranged facing each other.

29. A de-icing device according to claim 16, characterized in that the emission window(s) (202) located on the intrados side (I) and the emission window(s) (204) located on the extrados side (E) are staggered from each other.

30. A vane (10) of an inlet guide wheel (4) of a turbojet (2), of the type comprising a fixed part (12) and a mobile flap (18) capable of pivoting about a substantially radial direction (22) starting from a central hub (8), characterized in that it is provided with a de-icing device according to claim 16.

31. An aircraft engine (2), characterized in that it comprises an inlet guide wheel (4) equipped with vanes (10) according to claim 30.

32. An aircraft engine (2), characterized in that it comprises at least one de-icing device according to claim 16.

* * * * *